2,999,851
ISOCYANATE EXTENSION OF VERY HIGH MOLECULAR WEIGHT POLYESTERS

Otto C. Elmer, Akron, Ohio, assignor to The General Tire & Rubber Company, Akron, Ohio, a corporation of Ohio
No Drawing. Filed Dec. 16, 1957, Ser. No. 702,810
4 Claims. (Cl. 260—75)

This invention relates to the preparation of millable, processable, polyester compositions, which are prepared from very high molecular weight polyesters.

The very high molecular weight polyesters have many properties, such as tensile strength, heat resistance, abrasion resistance, etc., which are desirable for use in making rubbery products such as tires, bushings, and the like. However, these polyesters have not enjoyed much commercial success because they are extremely difficult to mill, calender, and otherwise process with conventional rubber processing equipment.

It is, therefore, an object of the present invention to prepare modified, high molecular weight polyester compositions so that they are readily millable, calenderable, and otherwise processable.

It is an object to provide a method of preparing articles with good rubbery properties from very high molecular weight polyester compositions.

According to the present invention, high molecular weight polyesters, such as 50–50 poly(ethylene-propylene) sebacate in the molecular range of 10,000 to 20,000, may be reacted with a polyisocyanate to produce a more rubbery and less crystalline material. Unexpectedly, the modified polyester material can be more easily milled and processed then the original nonextended polyester.

The modified polyesters may be compounded with carbon black, calcium carbonate, clay, curing agents, and other fillers, and thereafter cured to produce finished articles having a variety of uses, such as belting, bushings, and the like which require various combinations of desirable physical properties including tensile strength, modulus, elongation, and tear strength.

The polyisocyanates used to extend the high molecular weight polyesters preferably are diisocyanates with two, and only two, reactive groups. The polyisocyanates generally are used in the range of 1 up to 10 weight equivalents per weight equivalent of polyester although the preferred range is about 2 to 6 weight equivalents.

Trifunctional isocyanates tend to act as cross-linking agents and are undesirable in appreciable quantity unless one of the functional isocyanate groups is relatively non-reactive since diisocyanates unexpectedly do not act as cross-linking agents to any appreciable extent. Various aliphatic and aromatic diisocyanates are commercially available and the following is a partial list:

(1) 2,4-tolylene-diisocyanate
(2) p,p'-diisocyanato diphenyl methane
(3) Naphthalene-1,5-diisocyanate
(4) Bi-tolylene diisocyanate
(5) Dianisidine diisocyanate
(6) Paraphenylene diisocyanate
(7) Metaphenylene diisocyanate
(8) Meta xylene diisocyanate
(9) Benzidine diisocyanate
(10) Hexamethylene diisocyanate The high molecular weight dihydroxy terminated polyesters are described in the Industrial and Engineering Chemistry Article, page 1090, entitled "Rubberlike Products from Linear Polyesters" by Biggs et al. September 1947. The preferred polyesters have a molecular weight of about 11,000 to 14,000 and are reaction products of: (1) a polyether glycol having the general formula:

$$HO-(RO)_n-H$$

where $n$ is an integer of 1 to 50, and where R is a divalent hydrocarbon alkylene radical having at least two carbon atoms such as ethylene, propylene, isopropylene, butylene, etc., with (2) a dicarboxylic acid of preferably from 4 to 10 carbon atoms, such as succinic, glutaric, adipic, pimelic, suberic, azelaic, and sebacic acid.

Various fillers such as carbon black, clay, Hi-Sil-C, and calcium carbonate may be used to reinforce the extended polyester material so as to obtain desired properties. For example, polyester compositions with relatively high modulus, low elongation, low tear strength, and low tensile permanent set may be obtained by using carbon black as a filler. On the other hand extended polyester compositions with medium values of physical properties such as tear strength and tensile strength, along with a low modulus may be obtained by using Hi-Sil-C. Hi-Sil-C is a slightly hydrated silica of extremely fine particle size made by a wet process.

The modified polyester compositions of the present invention are preferably cured with a dialkyl peroxide curing agent such as dicumyl peroxide, which is 2,2-bis-(2-phenyl) peroxy propane. The use of a dialkyl peroxide curing agent enables the compounding of the polyester composition with carbon black, which hithertobefore could not be successfully used with the polyester material.

Free polyisocyanate may be used as a suitable curing agent, the polyisocyanates being added in excess amount over that required to react with hydroxyl end groups of the polyesters. The modified high molecular weight polyesters may be conveniently cured by milling in free polyisocyanate such as one of the organic diisocyanates previously mentioned as suitable modifying agents for the high molecular weight polyesters. The free diisocyanate used for curing is preferably milled in with the modified polyesters in amounts of about 0.5 to 8 percent by weight of the weight of the modified polyester.

The organic dialkyl peroxides apparently withdraw hydrogen atoms from activated methylene groups of the polyester to form free radicals which can crosslink the polyester molecular chains. The peroxide curing agents are of the general formula R'—O—O—R, where R and R' are selected from substituted and unsubstituted organic groups including alkyl, aralkyl, and such groups containing one or more nonfunctional groups, such as halogen atoms as substituents. While the best results are obtained with dicumyl peroxide, other preferred type-curing agents are ditertiary butyl peroxide, di 2,2-bis (t-butyl) peroxy butane, chlorine substituted dialkyl peroxides such as 2,2-bis (dichlorophenyl) isopropyl peroxide. Also effective in carbon black-polyurethane elastomers are isopropyl peroxide, methyl cumyl peroxide, cymyl cumyl peroxide, t-butyl cumyl peroxide and 1-isobutoxy-1 cumyl peroxy ethane.

For nonblack stocks, suitable peroxides are t-butyl perbenzoate, lauroyl peroxide, or benzoyl peroxide may also be used. The peroxides preferably are used in amounts 0.5 to 8 percent by weight of the polyurethane.

In modifying the high molecular weight polyesters, the polyester and polyisocyanate are mixed together and allowed to react at any suitable temperature, preferably at a temperature of about 100 to 140° C. for a period as short as 15 minutes although at least about six hours is preferable. Polymerization or reacting at room temperatures requires a much longer time.

The following examples are intended to illustrate the present invention and not to limit it in any way:

EXAMPLE I

One hundred grams of a 50—50 poly(ethylene-propylene) sebacate having a molecular weight of about 12,000 was reacted with two grams of MDI (p,p'-diisocyanato diphenyl methane) by mixing the two ingredients and allowing them to stand in a closed container for about 15 hours at 120° C. The resultant material was more rubbery and less crystalline in nature than the starting polyester.

EXAMPLE II

The extended polyester material of Example I was compounded with fillers and curing agents as shown in Table 1, by milling the polyester material on a rubber mill. No unusual difficulty was encountered in milling the ordinarily very tough, hard-to-process polyester. The resultant compounded polyester material is cured at 298° F. for 45 minutes with about 45 pounds steam pressure. The results are shown below in Table 1.

Table 1

|  | A | B | C | D |
|---|---|---|---|---|
| 50/50 poly(ethylene-propylene) sebacate | 100 | 100 | 100 | 100 |
| MDI (p,p'-diisocyanato diphenyl methane) | 0 | 2 | 2 | 2 |
| Dicumyl peroxide | 1 | 0 | 2 | 2 |
| Hi-Sil-C | 40 | 40 | 40 | 0 |
| Carbon Black (EPC) |  |  |  | 40 |
| 300% Modulus | 857 | 525 | 1,100 |  |
| Tensile | 1,627 | 825 | 2,350 | 2,692 |
| Elongation | 470 | 600 | 430 | 230 |
| Tensile Set (percent) | 34 | 262 | 16 | 3 |
| Shore "A" | 80 | 92 | 58 | 63 |
| Tear | 129 | 162 | 160 | 87 |
| 72 Hr./300° F.: |  |  |  |  |
| Tensile | 75 | 175 | 550 | 1,875 |
| Elongation (percent) | 5 | 110 | 170 | 160 |
| Shore "A" | 92 | 80 | 56 | 63 |
| Tensile Set (percent) | 3 |  |  | 0 |

As noted in Table 1, a low modulus, rubbery polyester material may be obtained by using Hi-Sil-C, while a high modulus, low elongation polyester material may be obtained by reinforcing the polyester with carbon black and curing with an organic peroxide.

It is to be understood that in accordance with the provisions of the patent statutes, the particular form of product shown and described and the particular procedure set forth are presented for purposes of explanation and illustration and that various modifications of said product and procedure can be made without departing from my invention.

Having described my invention, what I claim is:

1. The method which comprises reacting a dihydroxy terminated polyester having a molecular weight of from about 10,000 to 20,000 and comprising the reaction product of an aliphatic dicarboxylic acid of from 4 to 10 carbon atoms and at least one glycol having the formula $HO(RO)_nH$ where $n$ is an integer from 1 to 50 and where R is an alkylene radical of from 2 to 4 carbon atoms with an organic diisocyanate to form a chain extended millable polyester urethane, the mol ratio of said polyester to said diisocyanate being essentially about 1:1.

2. The product prepared by the method of claim 1.

3. The method according to claim 1 in which said dihydroxy terminated polyester has a molecular weight of from about 11,000 to 14,000.

4. The product prepared by the method of claim 3.

References Cited in the file of this patent

UNITED STATES PATENTS

| 2,431,921 | Cook et al. | Dec. 2, 1947 |
| 2,625,532 | Seeger | Jan. 13, 1953 |
| 2,730,518 | Birley et al. | Jan. 10, 1956 |

OTHER REFERENCES

"The Van Nostrand Chemist's Dictionary," D. Van Nostrand Co., Inc., New York (1953), pp. 267–68.

Germany (KI IV b/39c), 1,000,998, Jan. 17, 1957.

UNITED STATES PATENT OFFICE
CERTIFICATE OF CORRECTION

Patent No. 2,999,851 September 12, 1961

Otto C. Elmer

It is hereby certified that error appears in the above numbered patent requiring correction and that the said Letters Patent should read as corrected below.

Column 4, line 18, after "integer" insert -- of --.

Signed and sealed this 30th day of January 1962.

(SEAL)
Attest:

ERNEST W. SWIDER
Attesting Officer

DAVID L. LADD
Commissioner of Patents